Figure 1:
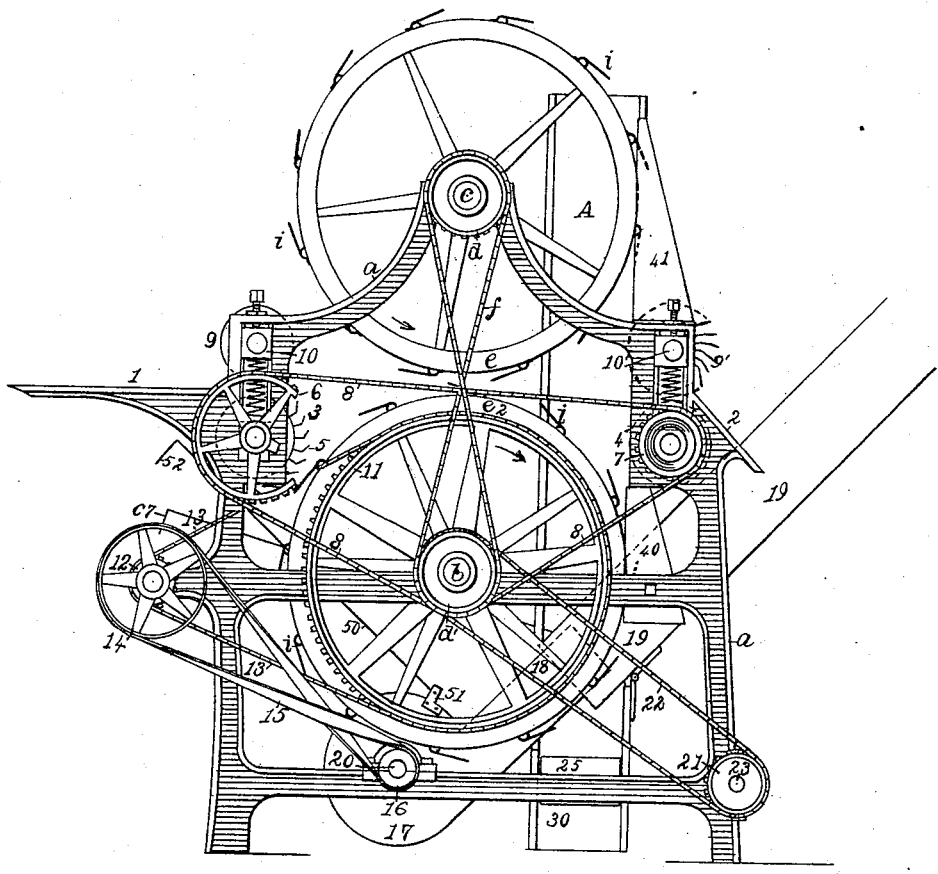

(No Model.)

5 Sheets—Sheet 1.

B. F. MOORE & C. A. WELLER.
HOP PICKER.

No. 563,504.  Patented July 7, 1896.

WITNESSES:
Henry S. Free.
Charles W. M. Hutchins

INVENTORS
Benjamin Frank Moore
Chester A. Weller
BY
H. Anderson
ATTORNEY.

(No Model.) 5 Sheets—Sheet 2.
B. F. MOORE & C. A. WELLER.
HOP PICKER.
No. 563,504. Patented July 7, 1896.
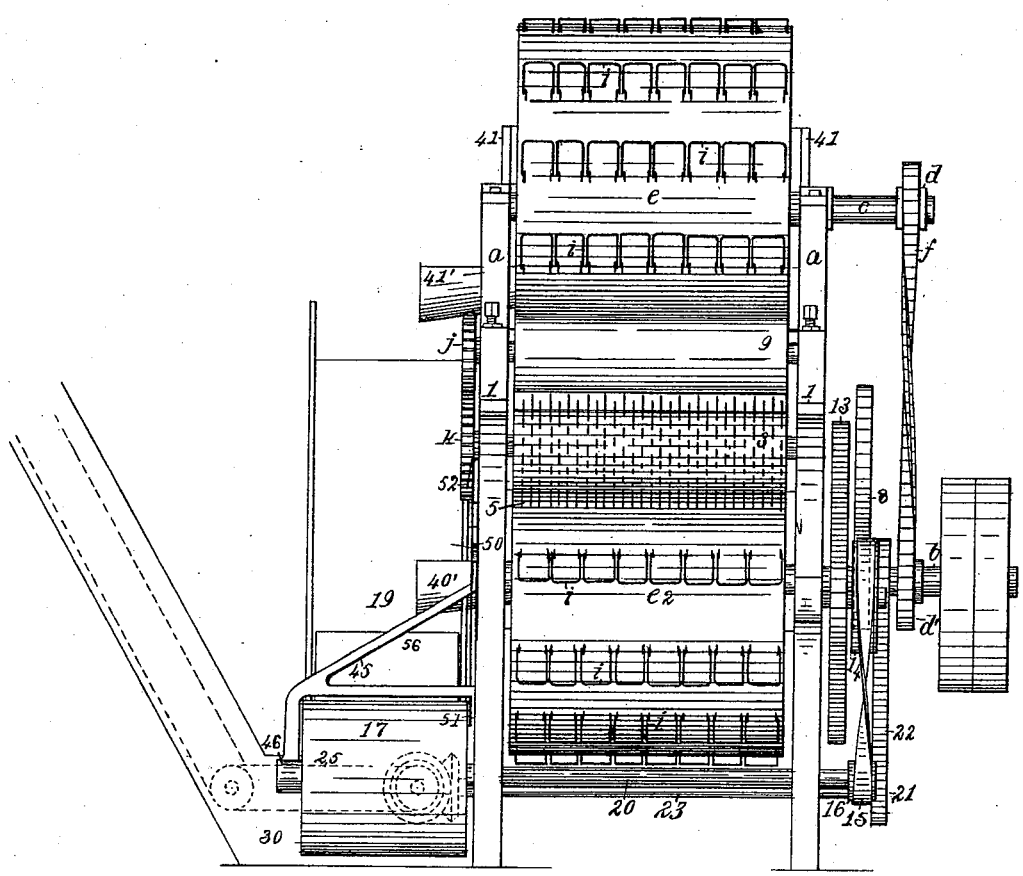
Fig. II
WITNESSES:
Henry S. Free.
Charles W. McCutchen
INVENTORS
B. Frank Moore
Chester A. Weller
BY
H. Anderson
ATTORNEY.

(No Model.) 5 Sheets—Sheet 3.
B. F. MOORE & C. A. WELLER.
HOP PICKER.
No. 563,504. Patented July 7, 1896.
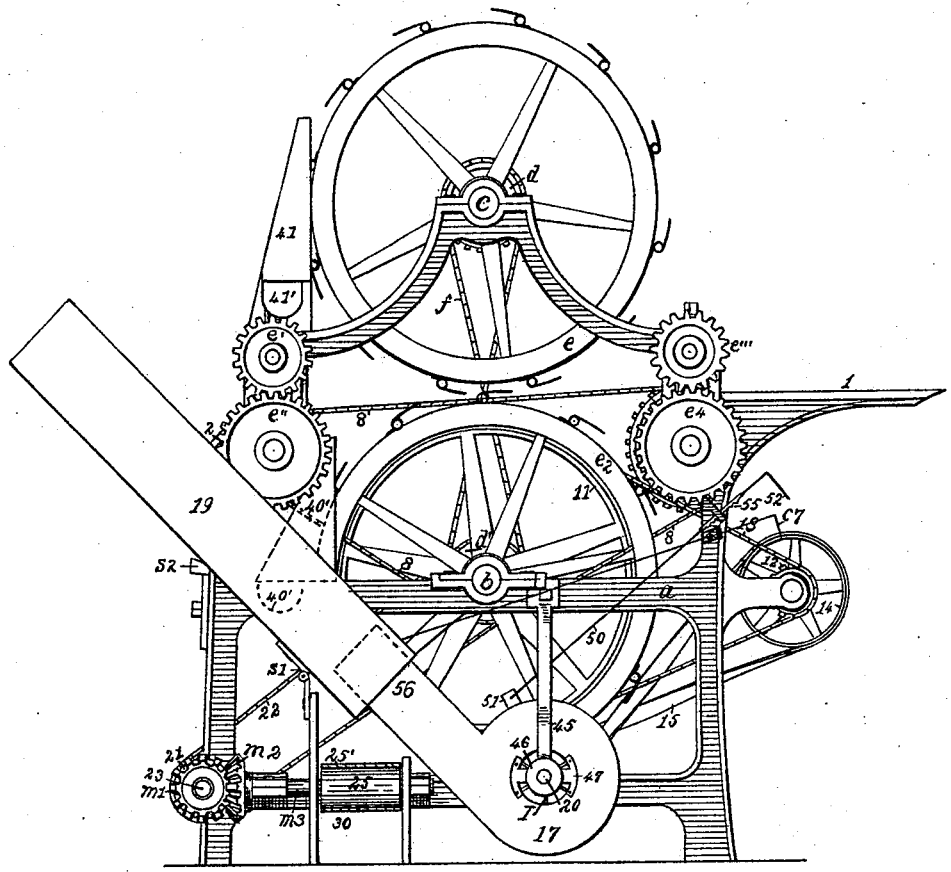
Fig. III
WITNESSES: INVENTORS
B. Frank Moore
Chester A. Weller
BY
H. Anderson
ATTORNEY.

(No Model.) 5 Sheets—Sheet 4.
B. F. MOORE & C. A. WELLER.
HOP PICKER.
No. 563,504. Patented July 7, 1896.
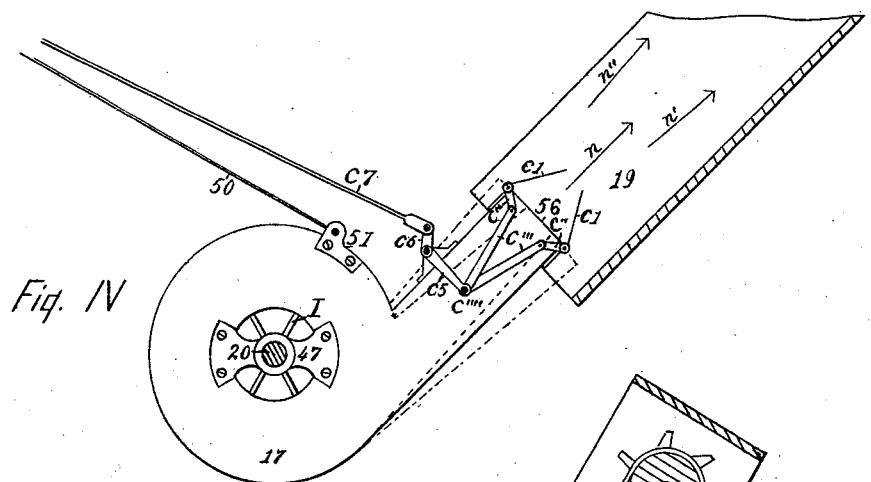
Fig. IV
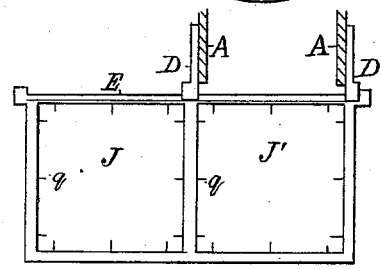
Fig. VI
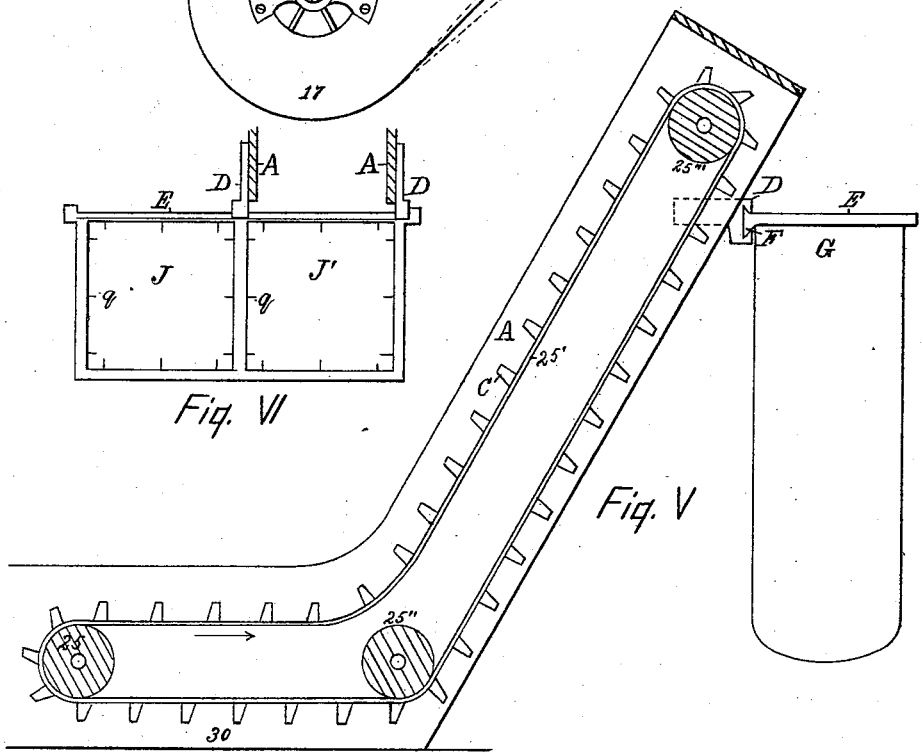
Fig. V
WITNESSES:
Henry S. Free
Charles W. M. Cutchins
INVENTORS
B. Frank Moore
Chester A. Weller
BY
H. Audusons
ATTORNEY.

(No Model.) 5 Sheets—Sheet 5.
B. F. MOORE & C. A. WELLER.
HOP PICKER.
No. 563,504. Patented July 7, 1896.
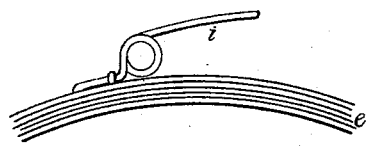
Fig. VII
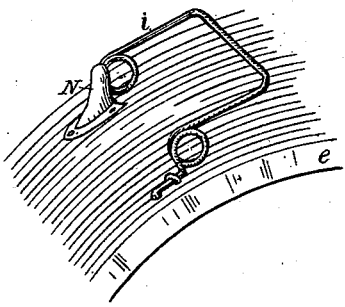
Fig. VIII
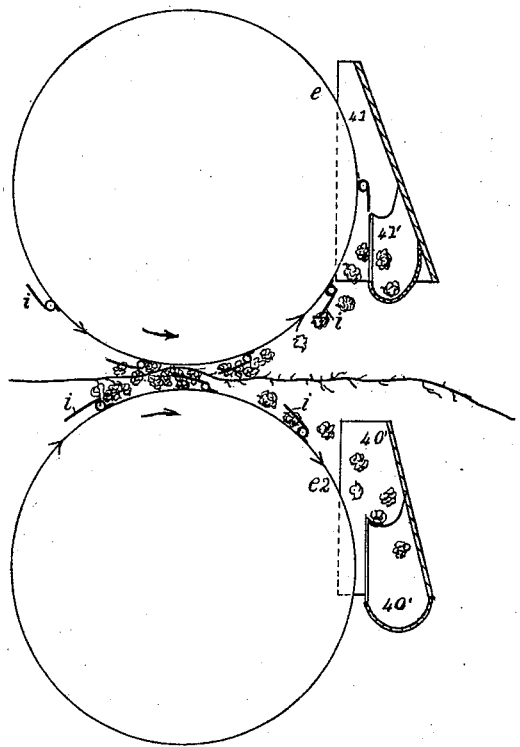
Fig. IX
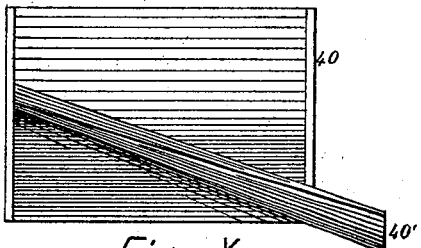
Fig. X
WITNESSES:
Henry S. Free.
Charles W. M. Cutchins
INVENTORS
B. Frank Moore
Chester A. Weller
BY
H. Anderson
ATTORNEY.
THE NORRIS PETERS CO., PHOTO-LITHO., WASHINGTON, D. C.

UNITED STATES PATENT OFFICE.

BENJAMIN FRANK MOORE AND CHESTER A. WELLER, OF SING SING, NEW YORK; SAID MOORE ASSIGNOR OF ONE-SIXTH OF THE RIGHT AND SAID WELLER ASSIGNOR TO JOHN GIBNEY, OF SAME PLACE.

HOP-PICKER.

SPECIFICATION forming part of Letters Patent No. 563,504, dated July 7, 1896.

Application filed December 26, 1895. Serial No. 573,382. (No model.)

*To all whom it may concern:*

Be it known that we, BENJAMIN FRANK MOORE and CHESTER A. WELLER, citizens of the United States, and residents of Sing Sing, in the county of Westchester and State of New York, have invented certain new and useful Improvements in Hop-Pickers, of which the following is a specification.

This invention relates to the picking of hops from their vines, the vines being gathered and conveyed to a convenient place for the picking. Its object is to provide a machine through which the vines may be passed, the hops stripped therefrom, separated from the leaves, and delivered into bags.

The object is attained by the means set forth in the accompanying drawings and this specification, which, taken together, we declare to be a full and accurate description of our invention, such as will enable others skilled in the art to which it appertains to make and use the same.

In the drawings like letters and numerals of reference apply to the several views.

Figure I, Sheet 1, is a side elevation of the right-hand side of the machine. Fig. II, Sheet 2, represents a front elevation of the machine. Fig. III, Sheet 3, represents an elevation of the left-hand side of the machine. Fig. IV, Sheet 4, are details relating to the fan. Fig. V, Sheet 4, are details relating to the conveyer. Fig. VI, Sheet 4, represents the bag-holder on the conveyer. Figs. VII and VIII, Sheet 5, are enlarged representations of the pickers. Figs. IX and X, Sheet 5, represent the plan for gathering the hops from the picking-cylinders.

Reference to Fig. I will give a general idea of the machine. The large cylinders $e$ are armed with pickers $i$. 1 represents the table, from which the vines are fed into the machine, and they are delivered from the incline 2 at the opposite end of the machine. Feed-rollers 9 3 carry the vines into the machine, and rollers 9 3 deliver them from the machine. The feed-rollers move less rapidly than the delivery-rollers, which tends to hold the vines taut, and the vines move at much less speed than the periphery of the picker-cylinders, so that the pickers come in rapid and repeated contact with both sides of the vine during its passage, leaving little chance for hops to remain on the vine.

As the hops are stripped from the vines the cylinders, with their pickers, tend to drive the picked hops in the direction of movement of the cylinder, so that the upper cylinder carries what it picks upward, and the lower cylinder impels its pickings downward. Chutes, to be more fully explained, are provided at the back of each cylinder, inclosed in hoods 40 41 to receive the hops, and they discharge the hops into a larger chute 19 at the left side of the machine.

At the lower end of the chute 19 is a fan 17 for giving a blast of air up through the chute. The hops are delivered into this chute, and the air-blast is intended to separate the fragments of leaves from the hops, the leaves passing over the top of the chute, and the hops dropping to the bottom and sliding out upon a conveyer-belt over the roller 25 in the frame 30. The elevator or conveyer stands at right angles to the machine and is indicated in Fig. I without any details.

Motion to all the moving parts of the machine is imparted through the shaft $b$ by means mostly of chain belting.

In entering upon the details of the various parts of the machine reference will be first made to Figs. I and II. The picker-cylinders may be wooden drums provided with rows of pickers $i$. They are shown in parallel rows in Fig. II, but they may be arranged spirally or in any irregular manner, so long as one point preferably be kept in view, namely: It is desirable that the pickers on the two cylinders pass each other alternately, as shown in Fig. I, for an object particularly shown in and explained in connection with Fig. IX. In the latter figure it will be seen that as the lower picker strikes the vine it forces the vine against the upper roller, and insures a good grip on the hops by the pickers. As the vine moves more slowly than the pickers travel the pickers have a sort of scraping or dragging action along the vines, pulling off the hops by striking behind them and breaking their stems. The solid backing afforded by the surface of the cylinder presented to each picker facilitates this action, and this alternating action of the successive rows of pickers bends the vine back and forth, so as to more completely expose all the hops to the action of the pickers.

The pickers $i$, Figs. I, II, VII, and VIII, are made of preferably spring-wire looped into the form shown, the two ends of the wire having one or more spiral coils, as in Fig. VIII, the terminals extending beyond the coils and adapted to be secured to a wooden drum or cylinder, as shown, i. e., the points penetrating the wood, staples just back of the coils making all secure. At N, Fig. VIII, is shown a metallic casing, to be fastened over the stapled end of the picker to present a smooth surface that will not catch in the vine. As in the figures, the loop end of the pickers rise somewhat away from the surface of the cylinder. It may be curved, as in Fig. VII, or straight, as in Fig. VIII. The action of the pickers on the hops when employed, as already described, is very much the same as that of the thumb and finger in stripping hops from the vines.

Motion is communicated from one picker-cylinder to the other by means of sprocket-wheels $d$ $d'$ and crossed chain $f$. As shown in Fig. II, power is applied to the machine by means of the pulleys on shaft $b$. A sprocket-wheel on the same shaft drives a chain 8, which passes over wheel 6, driving feed-roller 3, and wheel 7, driving delivery-roller 4. The feed-rollers are run more slowly than the delivery-rollers in order that the vine may be kept taut as possible while passing through the machine. These rollers are both of wood, with stiff wires 5 inserted therein, (see Fig. II,) and having their ends bent backward—that is, in a direction opposite the direction of their revolving. The object of these wires is to feed the vines without crushing the hops, and the backward inclination of the wires causes them to easily withdraw from the vines as the vines leave the rollers and avoids having the vines wind around the rollers. At the same time the wires present the forms of hooks, viewed from the position of the pickers as they strike the vine, and as hooks they grasp the vine on the feeding side and prevent its being drawn into the machine by the pickers, as it is plain might be the case.

The top feeding-roller 9 is made solid, so as to apply some force upon the vines and keep them in contact with the wires of the lower roller. The top delivery-roller is preferably provided with the bent wires to catch any fragments of vines that did not freely enter the delivery-rollers. As has been shown, power is applied to the lower rollers by means of a chain belt, and Fig. III shows how the upper rollers are geared to the lower rollers by wheels $e'$ $e''$ on the delivery-rollers, and $e'''$ $e^4$ on the feed-rollers. Although in both sets of rollers the upper roller is the smaller, the gearing used is such as to give the two rollers in each set the same peripheral speed.

There is also on shaft $b$ a large sprocket-wheel 11, which, by means of chain belt 13, drives a pinion 12 on a stud at the front of the machine. (See Fig. I.) A pulley 14 is fast to this pinion, so that the pulley, by means of belt 15, is made to drive the fan-pulley 16. The fan is on the left-hand side of the machine, but is driven by the wheels and belts on the right-hand side. The fan-shaft extends through the machine, and is supported at the fan end by the bracket-hanger 45, Fig. III.

Another wheel on shaft $b$ drives wheel 21 at the rear end of the machine by means of belt 22. The shaft 23, on which wheel 21 is fast, extends through to the left-hand side of the machine, where it carries miter-wheel $m'$, which meshes into the wheel $m^2$ on shaft $m^3$. Roller 25 is also fast to shaft $m^3$ and drives the conveyer-belt. (Shown in detail in Fig. V.)

It will thus be seen that power to all points requiring it is transmitted from the shaft $b$, although it is evident power, whether by pulley or hand-crank, might be applied to almost any of the other shafts.

As the hops are picked, of course leaves and twigs are gathered with them. The rapidity with which they are picked, together with the form of the pickers, causes the pickings to follow the surfaces of the picker-cylinders for a little distance, and means are applied for catching them, as shown in exaggerated form in Fig. IX. Hoods 40 41 are placed back of the cylinders, and within the hoods are chutes 40' 41'. The hoods are fast to the frame of the machine, and the chutes are arranged at a proper distance from the cylinders and at a height best adapted for catching the flying pickings. The chute for the upper cylinder is so placed that the pickings will strike the back of the hood and drop into the chute $s$. A front view of the hood and chute is given in Fig. X. The chutes are given an inclination that will cause the pickings to slide from them. They project from the side of the machine, as in Fig. II, and over the large chute 19, the lower one discharging into the side of said large chute, as in Fig. III.

The large chute 19, as shown in Figs. I and IV, is made adjustable, that is, so its upper end may be raised or lowered, by means of a hinge attached to its under side and an upward projection from the casing 30 and an adjustable bracket 52. As seen in Fig. IV, this chute will allow the hops to slide downward and drop upon the carrier-belt 25'. While the hops are thus falling from the small chutes into the large one is the time taken for separating them from the leaves. For this purpose the fan 17 is employed. The nozzle end 5 of the fan-casing projects into the end of the chute 19, as clearly shown in Fig. IV.

The hops, by reason of their shape, require a heavier breeze to blow them upward than do the leaves, although a continued blast against the hops will overcome the force of gravity and will impel them with the blast. For this reason the blast from the fan is regulated and so directed that it will be just above and not along the floor of the chute. As the falling pickings from the small chutes meet the blast of air from the fan, the broad and lighter leaves are at once carried away with and by it; but if the blast is properly adjusted to the condition of the hops they will fall through the current of air before it accumulates force enough against them to blow them away, and they will drop to the bottom of the chute and slide from it, as before described.

In order to regulate the air-blast in the manner described, the fan is made adjustable, as shown in Fig. IV. Bearings 47 are attached to each side of the fan-casing, and these bearings are swung on the fan-shaft 20. The shaft is supported, as shown in Fig. II. The fan-casing is thus made rotatable on the shaft, but the weight of its nozzle 5 would keep it (the nozzle) lying against the bottom of the clutch. A lug 51 is attached to the casing, however, and a rod 50 extends from it to near the feeding-table, as shown in Fig. IV, the upper end being bent into a handle 52. A rack 55 and a catch on the side of the machine indicate how by manipulation of the rod the nozzle of the fan may be adjusted to positions above the floor of the chute 19, the broken lines indicating varying positions.

In order to regulate not only the force of the blast, the speed of the machine not being altered, but also the depth of the blast, the wings $c'$ are hinged to the end of the nozzle and are made adjustable in this way: The cranks $c''$ are fast to the wings and they are united by rods $c'''$ to a lever $c^5 c^6$ at $c''''$. The lever $c^5 c^6$ is fulcrumed to the nozzle, as shown. The short end $c^6$ of this lever is attached to the rod $c^7$, and by manipulation of the rod the wings $c'$ $c'$ may be opened or closed. The rod $c^7$ is continued to a convenient point near the feeding-table, as shown in Fig. III. By these means the blast may be narrowed or widened as to depth, and by manipulation of the rod 50 the blast may be directed toward the bottom of the floor of the chute, as per arrow $n'$, or parallel with it, as per arrow $n$, or inclining upward from it, as per arrow $n''$, Fig. IV.

Fig. V illustrates the elevator. This stands at right angles to the machine. As shown in Fig. II, the hops drop from the chute 19 to the carrier-belt 25'. In Fig. V it will be seen that this belt is provided with carriers C. The belt is driven by roller 25. The belt moves in the direction of the arrows $n^2 n^3$, the weight of the belt above the rollers 25 25'' 25''' causing it to sag, as shown, and keep taut, as shown, below the rollers. The hops are carried to the top of the conveyer or elevator and dropped into a bag G, shown suspended therefrom. The bags are handled in the following manner: Brackets D are fast to the conveyer-casing A, one on each side, as in Fig. VI. By means of dovetailed slots in these brackets a frame E is supported and is movable from end to end in the slots. The frame in length is adapted to receive two bags, the pins or hooks $q$ on the inner sides being made to receive the bags. While the frame is in position for the filling of one bag an empty bag may be hung in the other division of the frame by the side of it, and when one bag is filled the frame may be moved so as to bring the empty bag in position for filling. Thus one bag after another may be filled without interruption to the working of the machine.

Having described our invention, what we claim, and desire to secure by Letters Patent of the United States, is—

1. A picker for a hop-picking machine consisting of an elastic wire looped to the form of three sides of a rectangle, having the ends turned into a coil in a plane vertical to the plane of the loop, the terminals of the coils adapted for fastening to a cylinder, substantially as herein shown and described.

2. The combination in a hop-picking machine with a pair of cylinders armed with longitudinally-parallel rows of pickers, and means for revolving them so that said parallel rows of pickers on one cylinder will meet the opposite cylinder midway between the parallel rows of pickers on said other cylinder, of vine-feeding rollers for passing the vines between the said picker-cylinders at a slower velocity than that of the periphery of the picker-cylinders, and means substantially as shown for catching the pickings from the vines and discharging them into a chute through which a regulatable blast of air causes a separation of the hops and leaves.

3. The combination of a receiver for the pickings, a fan at the end thereof, an axially-adjustable casing and nozzle therefor, swing valves at the outlet of said nozzle, and means whereby said valves are simultaneously adjusted, for regulating the volume and direction of the blast, substantially as shown and described.

4. In combination with a fan and a receiver of the pickings from a hop-picking machine, wherein the nozzle of said fan is adjustable in its relation to the bottom of said receiver, the fan-nozzle provided with wings $c'$, levers $c''$, connections $c'''$, levers $c^5$, $c^6$, a fulcrum attached to the nozzle, and an adjusting-rod $c^7$, whereby the direction and force of the blast may be regulated, substantially as shown and described.

5. A bag-holder for a hop-picking machine, in combination with a conveyer, comprising dovetailed brackets and a sliding frame, said frame adapted to hold two bags by means of hooks on their interior surfaces, and to slide
5 back and forth in the brackets, substantially as shown and described.

Signed at Sing Sing, in the county of Westchester and State of New York, this 29th day of October, A. D. 1895.

B. FRANK MOORE.
    CHESTER A. WELLER.

Witnesses:
 JOHN GIBNEY,
 B. F. KIPP.